Patented Feb. 23, 1954

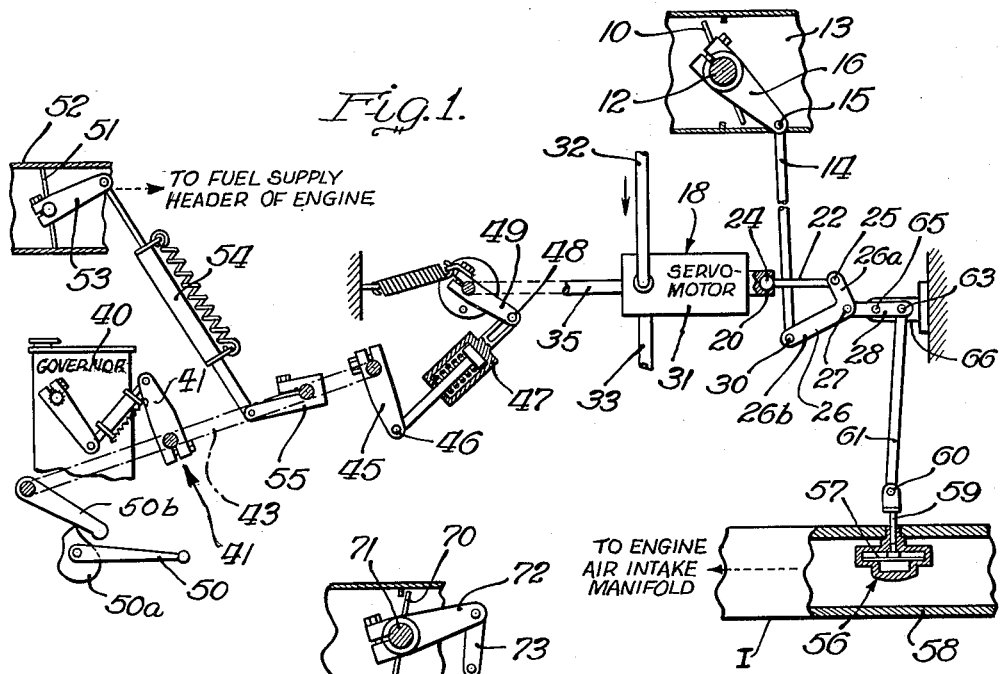

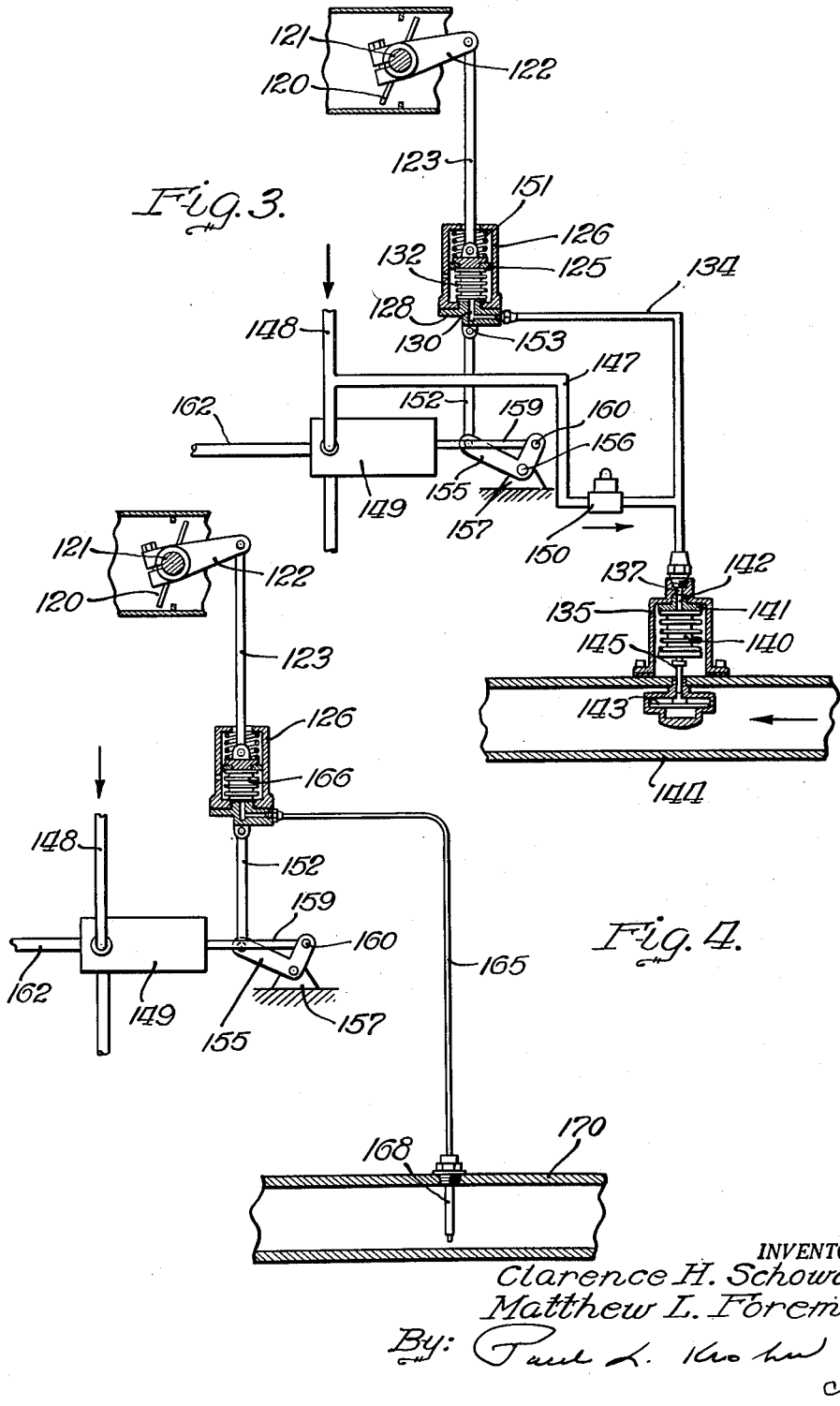

2,669,982

UNITED STATES PATENT OFFICE 2,669,982

AMBIENT AIR CONTROL OF BLOWER BY-PASSES

Clarence H. Schowalter, Beloit, Wis., and Matthew L. Foreman, Hamilton, Ohio, assignors to Fairbanks, Morse & Co., Chicago, Ill., a corporation of Illinois Application September 7, 1951, Serial No. 245,588

8 Claims. (Cl. 123—106)

1

This invention relates to fuel control apparatus for internal combustion engines. More particularly it has to do with apparatus for controlling the fuel mixture or the fuel-air ratio in engines arranged to operate on a gaseous fuel.

It has been found that, when operating an engine with a gaseous fuel, particular care must be taken to maintain proper air-fuel ratios in order to obtain adequate power output under varying load conditions.

It is therefore an important object of the present invention to provide a control mechanism for maintaining a desirable air-fuel ratio in an engine under varying load conditions.

Another object of this invention is to provide an air bypass control system which is capable of regulating the air-fuel ratio of an engine and is responsive to the temperature of the ambient air which is drawn into the engine.

Another object is to provide apparatus for regulating the air-fuel ratio in accordance with engine loading and additionally in accordance with the temperature of the intake air.

The control system of the present invention may be used with any internal combustion engine operable on a gaseous fuel. Heretofore the quantity of combustion air delivered to an engine has been controlled manually or through control units responsive to changes in various operating conditions such as the temperature of the exhaust gases, the engine speed, the engine load, the temperature of the fuel, etc. The applicants have found that a definite relationship exists between the temperature of the air and the quantity of air that must be delivered to the combustion space to obtain efficient burning of the fuel. Thus it has been found that an engine using inlet air at, for example, 100° F. will require more air for each combustion within each cylinder than it will if it used inlet air at 75° F. Or, stating this principle in another way, the higher the temperature of the air surrounding the engine, the greater the quantity of air that must be mixed with a unit charge of gaseous fuel. The application of this newly discovered relationship results in more efficient operation of the engine since, not only is the combustion of the fuel more efficient, but also the power required to drive the blower is kept at a minimum for any set of operating conditions.

According to an important feature of the present invention, a bypass valve is installed in the blower which supplies combustion air to the engine. A thermostatic control member is mounted in the engine air manifold with a linkage

2 connecting the movable element of the control member to the bypass valve. The air manifold may receive intake air from the engine room or from outside the engine room. Hereinafter this untreated air, which surrounds the engine or the engine room, will be referred to as air at ambient temperature. An increase in the ambient air temperature will directly affect the temperature within the air manifold thereby causing movement of the temperature responsive element of the thermostatic control element. This movement is transmitted to the blower by the connecting linkage to move the bypass valve to a "no bypass" position. Thus, with the control mechanism of this invention, as the ambient air temperature rises, more air is directed to the engine since the bypass is throttled down. As the ambient air temperature drops, the bypass valve is opened, more air is bypassed, and less air is delivered to the engine.

A special feature of this invention is the manner in which the operation of the temperature-controlled air bypass valve is correlated with the other mechanisms which control the operation of the engine.

On the drawings:

Figure 1 is a schematic drawing of an air bypass control mechanism constructed in accordance with the teachings of the present invention.

Figure 2 is a schematic drawing of a modified arrangement of the control mechanism of this invention.

Figure 3 is a schematic drawing of a second modification of the control mechanism.

Figure 4 is a schematic drawing of a third modification of the control mechanism.

Figure 5 is a schematic view of a typical blower bypass arrangement.

As shown on the drawings:

In Figure 1 the reference numeral 10 indicates a valve mounted on a rotatable shaft 12. This valve may be of any standard design adapted to be positioned in a bypass line 13 leading from the discharge side of a blower back to the suction side and arranged to progressively open or close the air passageway therethrough. As is well understood, with such an arrangement the quantity of air delivered to the engine by the blower will depend upon the angular position of the valve 10.

Figure 5 illustrates the valve controlled bypass 13 in relation to a blower B of suitable type, which preferably is driven from the engine (not shown) to be supplied with combustion air. The engine air supply manifold M extends from the output side of the blower, while the blower intake may be supplied with ambient air through the intake conduit I. As shown, the bypass conduit 13 may be connected between the manifold M and the blower intake conduit I.

The angular position of the valve 10 may be changed by means of a connecting link 14 which is pivoted at 15 to a radius arm 16 secured to the shaft 12. According to the present invention the connecting link 14 may be adjustably moved by means of a servo-motor 18 that has a plunger 20 movable axially inside the servo-motor casing. A short rod 22 is connected by means of a ball and socket joint 24 to the end of the servo-motor plunger 20. The other end of the rod 22 is pivotally connected at 25 to one arm 26a of a bellcrank 26 that has a fulcrum 27 on a lever 28 and a second arm 26b pivotally connected at 30 to the connecting link 14.

The servo-motor 18 may be of any suitable type. The one herein illustrated is similar to that described in Patent No. 2,321,264 and is briefly described as follows. Oil under pressure is delivered to the inside of a closed cylindrical casing 31 by an oil inlet line 32 and taken from the casing through a drain line 33. Inside the casing the oil enters the inside of a piston (not shown) through ports which are opened and closed by the rotary movements of a shaft 35. The plunger 20 is connected to the piston inside the casing so that axial movement of the piston in response to oil pressure will cause a corresponding shift of the plunger 20 and, through the aforementioned linkage, an angular movement of the air bypass valve 10. The extent of plunger movement here is regulated in accordance with angular settings of the control shaft 35.

The rotary setting of the shaft 35 is controlled by a speed governor 40 which is connected, through a suitable linkage 41, to a rotary shaft 43. An arm 45 is keyed to the shaft 43 and has a free end pivotally connected at 46 to a resilient linkage 47. The linkage 47 is pivotally engaged at 48 with an arm 49 that extends outwardly from the shaft 35. It will be recognized therefore that movements of the governor linkage 41 will cause a corresponding rotary movement of the shaft 35.

A gas throttle valve 51, mounted in the engine gaseous fuel supply conduit 52, is controlled by rotary movement of the shaft 43 through a linkage including an arm 53, a link 54, and a second arm 55 that is keyed to the shaft 43.

The arm 45 in addition to its relation to shaft 35, may be arranged to control various other engine equipment as for example, in the manner described in the copending application of the applicant Clarence H. Schowalter, Serial No. 721,549, filed January 11, 1947, now issued as Patent No. 2,612,880. Also, a manual control lever 50 may be provided for the shaft 43 as shown in said copending application. Further a control cam 50a may be arranged to rotate the shaft 43 through an arm 50b so that the operation of a master gas shutoff valve (not shown) may be coordinated with the operation of the gas throttle valve 51.

It is to be noted here that it may be desired at times, to disable governor control of the bypass valve 10 as effected through the servo-motor 31. To this end then, the servo-motor may be rendered inoperative as by closing a suitable control valve in the oil pressure delivery line 32 to the servo-motor. Such valve may be operated directly from the control system (not shown) of the engine.

A special feature of this invention is the provision of a temperature responsive member or device 56 which is mounted in an intake air conduit 58 which may be and preferably is a part or section of the blower intake conduit I (Fig. 5). The member 56 has an element 57 movable in response to changes in temperature of the air in the conduit 58. A push rod 59 is mounted on the element 57 and is pivotally connected at 60 to connecting link 61. The link is pivotally connected at 63 to the lever 28 which is fulcrumed at 65 on a rigid support 66. Thus, movements of the thermosensitive element 57 cause pivoting of the lever 28.

It is to be understood that the plunger 20 of the servomotor 31 will assume a fixed position after it has been adjustably moved in response to the governor 40, and therefore the ball and socket joint 24 will provide a fixed pivot point in relation to adjusting movements of the rod 22 and the bellcrank 26 by the lever 28. In operation, an upward movement of the connecting link 61 causes counterclockwise rotation of the lever 28 and a movement of the arm 26a and the rod 22 toward a straight line position. The pivot 30 is moved downwardly causing a rotary adjustment movement of the valve 10. If the connecting link 61 is moved downwardly, an opposite rotary adjusting movement of the valve 10 is effected.

In Figure 2 a hydraulic system for rotating the air bypass valve is shown. In this modification, the valve 70 (corresponding to valve 10) is mounted on a shaft 71 which carries an arm 72. A short link 73 is pivotally connected at one end to the arm 72 and at the other end, to a push rod 75 that carries a piston 77 at one end. The piston is slidably movable in a closed fluid cylinder 79 that is in turn slidable in a fixed cylinder 80. The inner cylinder 79 has a port 82 registering with a port 83 in the outer cylinder 80 so that fluid will pass into the cylinder 79 below the piston 77 from a conduit 85 that is secured at one end in the port 83. A coil spring 86 is disposed inside the cylinder 79 between the piston 77 and an end wall of the cylinder to resiliently resist upward movement of the piston 77. The fluid conduit 85 is connected at its other end to a fixed closed fluid cylinder 88 in which a piston 89 is slidably disposed. A piston rod 91 passes through an opening 92 in the cylinder 88 and is connected, in any suitable manner, to a rod 93 that is carried by a temperature-responsive element 95 of a control member or device 96 disposed in an air conduit 97. Conduit 97 as before, is a part of the blower intake conduit I.

The fluid conduit 85 is maintained in a full condition by a conduit 100 which is in flow communication with an oil inlet conduit 101 of a servo-motor 102. A one-way check valve 103 is connected in the line 100.

The servo-motor 102 is identical to the servo-motor 18 described in connection with Figure 1. A plunger 105 projects through the end wall of the servo-motor casing and is connected through a bellcrank 106, to a rod 107 that is secured to the inner cylinder 79. The bellcrank is fulcrumed at 109 on a fixed support 110. Therefore, movements of the plunger 105 cause corresponding movements of the cylinder 79. It will be understood that the servo-motor 102 has a rotary shaft 112 that is controlled by the same type of governor or manually controlled linkage as described in connection with the servo-motor 18 of Figure 1.

From the foregoing description it will be evident that the angular position of the air bypass valve 70 may be adjusted either by the servo-motor 102 or by the control member 96, and that each of these control mechanisms operate independently of each other.

In Figure 3, a further hydraulic control system for the air bypass control valve is illustrated. In this arrangement a bypass valve 120 (again corresponding to valve 10) is keyed to a shaft 121 which carries an arm 122. A connecting link 123 is pivotally connected at one end to the arm 122, and at the other end, to a piston 125 which is slidably disposed in an open-ended cylinder 126. One end of the cylinder 126 is closed by a cap 128 which is provided with an internal passage 130. A bellows 132 is secured in sealed engagement between the cap 128 and the piston 125 with the passage 130 in communication with the inside of the bellows. A flexible fluid conduit 134 is connected into the cap 128 in flow communication with the passage 130. At its opposite end the conduit 134 is connected to a support housing 135 in communication with a passage 137 provided in the top central portion thereof. A closed bellows 140 is disposed inside the housing 135 having a capped end 141 in sealed engagement with the wall of the housing. A passage 142 in the capped end communicates the inside of the bellows 140 with the passage 137 in the support housing 135. A thermo-sensitive control member 143, mounted in an air conduit 144, carries a push rod 145 which is secured to the outside of the bellows. Again, conduit 144 represents a part of the intake conduit I (Fig. 5).

The conduit 134 is maintained in a full condition by means of a fluid line 147 connected to an oil inlet line 148 to a servo-motor 149. A check valve 150 in the line 147 prevents backflow of fluid in the line.

A rise in temperature of the air in the air conduit 144 will cause the control member 143 to shorten the length of the bellows 140, causing fluid to be displaced in the conduit 134 with a resulting increase in the length of the bellows 132 and a movement of the piston 125 against the resistance of a spring 151 disposed in the cylinder 126. Movement of the piston 125 causes an angular movement of the valve 120 in the bypass closing direction.

The entire cylinder 126 may be bodily moved by means of a connecting link 152 that is pivotally mounted at one end to a tab 153 projecting from the cap 128. At the other end the link 152 is pivotally connected to a bellcrank 155 which is pivoted at 156 on a fixed support 157. A plunger 159 of the servo-motor 149 is pivotally connected at 160 to the bellcrank 155. Thus axial movements of the plunger 159 will cause a bodily displacement of the cylinder 126, and, consequently, an angular movement of the valve 120. It will be understood, of course, that the cylinder 126 is mounted on a suitable support in a manner which will permit bodily movement.

As in the case of the servo-motor 18 of Figure 1, a rotary shaft 162 of the servo-motor 149 may be controlled by a speed governor or a manual control.

In Figure 4 a still further modification of the air bypass valve control is illustrated. This arrangement is similar to that illustrated in Figure 3, differing from the latter in that a single closed fluid conduit 165 connects a movable bellows 166 to a thermosensitive bulb 168 that is mounted in the air conduit 170. Changes in temperature of the air in a conduit 170 will cause an expansion or contraction of the fluid in the bulb 168 and in the conduit 165, which will cause a corresponding contraction or expansion of a bellows 166. It is to be noted that in this arrangement, a gaseous fluid may be employed in the closed system comprised of the bellows 166, conduit 165 and thermal element 168.

From the foregoing description it will be seen that there is provided in this invention a new means for obtaining a more efficient combustion of the fuel in an engine. In operation the speed responsive governor controls the quantities of gaseous fuel that are supplied in accordance with engine load conditions. By means of the servo-motor, the quantity of air delivered to the combustion chamber is varied by the governor as the size of a unit charge of gaseous fuel is varied.

The novel control unit, featured in this invention, imposes an additional regulation on the air supplied per unit charge of gaseous fuel. This fine adjustment of the air supply, in accordance with ambient air temperature changes, results in a more efficient combustion than is possible when the air-fuel ratio is controlled by the speed governor alone.

In Figure 1 the close cooperation between the controls imposed by the governor and by the thermostatic element is readily evident. On one hand, changes in temperature of the ambient air are effective to shift the fulcrum of the servo-motor control linkage and thus regulate its effective range of movement. Conversely, a shift in the position of the control linkage, due to servo-motor actuation, will shift the control linkage so that the effective range of the thermostatic control element is changed.

It will be understood that modifications and variations may be effected without departing from the scope of the novel concepts of the present invention.

We claim:

1. In a control system for an engine having a combustion chamber, the combination of a conduit communicating with the combustion chamber, means for directing intake air through said conduit, an adjustable valve controlling flow of air through said conduit, a control unit having an element movable in response to changes in the temperature of the intake air, a motion transmitting mechanism operatively connected between said movable element and said valve to effect adjusting movement of said valve in response to temperature changes, a governor having a member movable in response to changes in engine speed, a second conduit arranged to deliver gaseous fuel to the combustion chamber, a second adjustable valve controlling the quantity of gaseous fuel passing through the second conduit, a linkage connecting said second valve with the movable element of said governor to effect adjusting movement of said valve in response to changes in engine speed, and means connecting said movable element of said governor to said first valve to effect adjusting movement of said first valve in accordance with engine speed, movement of said governor control element being entirely independent of adjusting movement of said temperature responsive element.

2. In a system for supplying air to the combustion chamber of an engine, the combination of a conduit communicating with the combustion chamber, a blower having a suction connection to a source of intake air at ambient temperature and a discharge connection to said conduit, a bypass conduit connecting the suction side of the blower to the discharge side thereof, an adjustable valve in said bypass conduit controlling the flow of air therethrough, a closed hydraulic system, a cylinder at each end of said hydraulic system, a first piston slidably disposed in one of said cylinders, a control unit having an element movable in response to changes in temperature of the intake air at its source and being connected to said first piston, and a second piston disposed in the other of said cylinders and connected to said valve to control the air-throttling position thereof, movement of said first piston in response to movement of the temperature-responsive element of said control unit being effective through said hydraulic system to cause a corresponding movement of said second piston and a change in the position of said valve.

3. In a system for supplying air to the combustion chamber of an engine, the combination of a conduit communicating with the combustion chamber, a blower having a suction connection to a source of intake air at ambient temperature and a discharge connection to said conduit, a bypass conduit connecting the discharge side of said blower to the suction side thereof, an adjustable valve in said bypass conduit for restricting flow of air therethrough, a control unit having an element movable in response to changes in the temperature of the intake air, a closed hydraulic line, and a bellows at each end of said line, each bellows having a portion mounted in fixed position and a member movable as the bellows expands or contracts, the movable member of one of said bellows being attached to the temperature-responsive member of said control unit, and the movable member of the other bellows being connected to said valve, whereby movements of said temperature-responsive member due to changes in intake air temperature will cause a corresponding movement of said valve.

4. In a system for supplying air to the combustion chamber of an engine, the combination of a conduit communicating with the combustion chamber, a blower having a suction connection to a source of intake air at ambient temperature and a discharge connection to said conduit, a bypass conduit connecting the discharge side of the blower to the suction side thereof, an adjustable valve in said bypass conduit movable to regulate the quantity of air bypassed, a control unit having an element movable in response to changes in the temperature of the intake air at its source, a closed hydraulic system, a first displaceable member in said hydraulic system connected to the movable element of said control unit, and a second displaceable member in said hydraulic system connected to said valve, movement of said control element being effective through said hydraulic system to cause a corresponding movement of said second displaceable member and angular shifting of said valve.

5. In a system for supplying air to the combustion chamber of an engine, the combination of a conduit communicating with the combustion chamber, a blower having a suction connection to a source of intake air and a discharge connection to said conduit, a bypass conduit connecting the discharge side of the blower to the suction side thereof, an adjustable valve in said bypass conduit movable to regulate the quantity of air bypassed, a closed fluid system, a hollow thermo-sensitive bulb in said system in intimate contact with the intake air, changes in the temperature of the air causing contraction or expansion of the fluid in said system, a follower member in said system connected to said adjustable valve and movable in response to expansion or contraction of the fluid, to effect adjusting movements of said valve.

6. In an air supply system for an internal combustion engine, means for delivering air to the engine, means for regulating the quantity of air delivered by the first said means, an engine speed responsive servo-motor for actuating said regulating means, an operating connection between said regulating means and servo-motor, and air temperature responsive means operable independently of said servo-motor, to actuate said regulating means.

7. In an air supply system for an internal combustion engine, means for delivering air to the engine, means for regulating the quantity of air delivered to the engine by the first said means, engine speed responsive servo-motor for actuating said regulating means, an operating connection between said regulating means and servo-motor, and air temperature responsive means operable through said operating connection and independently of said servo-motor, to actuate said regulating means.

8. In an air supply system for an internal combustion engine, means for delivering air to the engine, means for regulating the quantity of air delivered by the first said means, an engine speed responsive servo-motor for actuating said regulating means, motion transmitting means connected with said regulating means and including an operating connection between said regulating means and servo-motor, and air temperature responsive means operable through said motion transmitting means and independently of said servo-motor to actuate said regulating means.

CLARENCE H. SCHOWALTER.
MATTHEW L. FOREMAN.

References Cited in the file of this patent

UNITED STATES PATENTS

| Number | Name | Date |
|---|---|---|
| 1,821,662 | Muller | Sept. 1, 1931 |
| 1,838,408 | King et al. | Dec. 29, 1931 |
| 2,088,954 | Gregg | Aug. 3, 1937 |
| 2,388,669 | Baker | Nov. 13, 1945 |
| 2,504,243 | Anderson | Apr. 18, 1950 |
| 2,558,884 | Steven et al. | July 3, 1951 |